(12) United States Patent
Heath (10) Patent No.: US 8,082,336 B1
(45) Date of Patent: Dec. 20, 2011

(54) DECOUPLED TERMINAL SERVER

(75) Inventor: Taliver Heath, Mountain View, CA (US)

(73) Assignee: Google Inc., Mountain View, CA (US)

( * ) Notice: Subject to any disclaimer, the term of this patent is extended or adjusted under 35 U.S.C. 154(b) by 1269 days.

(21) Appl. No.: 11/694,592

(22) Filed: Mar. 30, 2007

(51) Int. Cl.
*G06F 15/173* (2006.01)
(52) U.S. Cl. .......................... 709/223; 709/203; 709/220
(58) Field of Classification Search .................. 709/223, 709/203, 227, 220
See application file for complete search history.

(56) References Cited

U.S. PATENT DOCUMENTS

| 2005/0165834 | A1* | 7/2005 | Nadeau et al. | 707/103 R |
| 2005/0180435 | A1* | 8/2005 | Hsu | 370/401 |
| 2005/0243824 | A1* | 11/2005 | Abbazia et al. | 370/390 |

OTHER PUBLICATIONS

Cyclades ACS Advanced Console Server—Installation, Administration and User Guide, Avocent Corporation, 2006, 208 pages (will not be furnished because it is available as part of IDS submitted on Jan. 14, 2009).*
Avocent, SPC420/820/1620 Power Control Device, 2 pages, 2006.
Avocent, Cyclades®PM, Intelligent Power Distribution Unit, Integrated Remote Power Management and Distribution, 6 pages, 2006.
Avocent. "Cyclades ACS. Installation/Administration/User Guide." 2006 Avocent Corporation (208 pages)., 2006.

* cited by examiner

*Primary Examiner* — Philip B Tran
(74) *Attorney, Agent, or Firm* — Fish & Richardson P.C.

(57) ABSTRACT

Power agent control instructions based on one or more power agent device types and control environment instructions associated with a terminal server can be executed to instantiate a terminal server control environment in which the power agent control instructions are executed.

17 Claims, 8 Drawing Sheets

DECOUPLED TERMINAL SERVER

BACKGROUND

This application relates to terminal servers.

A conventional terminal server is a device that includes one or more communication ports to communicate with one or more devices. An example terminal server is a serial concentrator that communicates serial communication port traffic over one or more connections (e.g., a TCP/IP connection, TELNET connection, secure shell connection, or a connection in accordance with another communication protocol). The terminal server can, for example, be connected to one or more server computers through the communication ports. The server computers, in turn, can be connected to a network, such as a wide area network (WAN) or the Internet, to facilitate in-band communication and management. In the event a server computer malfunctions and is not responding to in-band communications, out-of-band management and troubleshooting can be facilitated through the serial communication port.

A terminal server can also be connected to an associated agent through one of the communication ports. For example, a power agent device can provide power to the server computers connected to the terminal server. The power agent can likewise be connected to the terminal sever and controlled through the terminal server to facilitate power functions, e.g., cycling power to a server computer, shutting power off for one or more server computers, etc.

The associated agent device can be controlled through a terminal server control environment. Typically, however, the agent device is controlled according a proprietary control scheme, and thus the terminal server does not readily facilitate control of third-party agent devices of different types. Additionally, proprietary control schemes do not facilitate flexibility in the control process. For example, if a power agent device cycles power to a server computer, it may be desirable to execute additional processes to log the power cycle and ensure that the server computer has recovered, e.g., log the date and time of the power cycle and execute an in-band handshake process to ensure that the server computer has recovered. Such additional processes, however, are not readily integrated with a conventional agent device command.

SUMMARY

Disclosed herein is a decoupled terminal server that facilitates control of agent devices of different agent device types. In an example implementation, a system includes a terminal server device, one or more agent devices, and a data store. The terminal server includes a plurality of communication ports. Each agent device includes a plurality of agent ports and a communication port. The communication port of each agent device can be connected to a corresponding communication port of the terminal server. The data store can be in communication with the terminal server, and can store instructions executable by the terminal server. The instructions can include control environment instructions and agent device control instruction sets. Upon execution by the terminal server, the control environment instructions can instantiate a control environment to facilitate control of the one or more agent devices. The agent device control instruction sets are configured to be executed in response to corresponding control environment commands. Each agent device control instruction set can be based on a corresponding agent device type and configured to facilitate control of one or more corresponding agent devices.

In another example implementation, a system includes a terminal sever and a data store. The terminal server includes a plurality of communication ports. The data store can be in communication with the terminal server and can store instructions executable by the terminal server. The instructions can include control environment instructions that upon execution by the terminal server instantiate a control environment to facilitate control of one or more power agent devices in communication with the terminal server over corresponding communication ports. The instructions can also include power agent device control instruction sets configured to be executed in response to corresponding control environment commands. Each power agent device control instruction set can be based on a corresponding power agent device type and configured to facilitate control of one or more corresponding power agent devices.

Storing power agent control instruction sets for different power agent types can, for example, decouple a terminal server from a proprietary control scheme of an associated agent device. Additionally, in another implementation, the agent device control instruction sets can associate one or more agent port process commands with one or more secondary process commands. Such association can, for example, provide flexibility in designing and implementing control processing schemes for agent devices of different types. In another implementation, the agent device control instruction sets can also define whether the one or more of the process commands and one or more of the associated secondary commands are to be transmitted in-band or out-of-band, which, in turn, facilitates implementation of a control scheme over one or more communication protocols.

DETAILED DESCRIPTION

Figure 1:
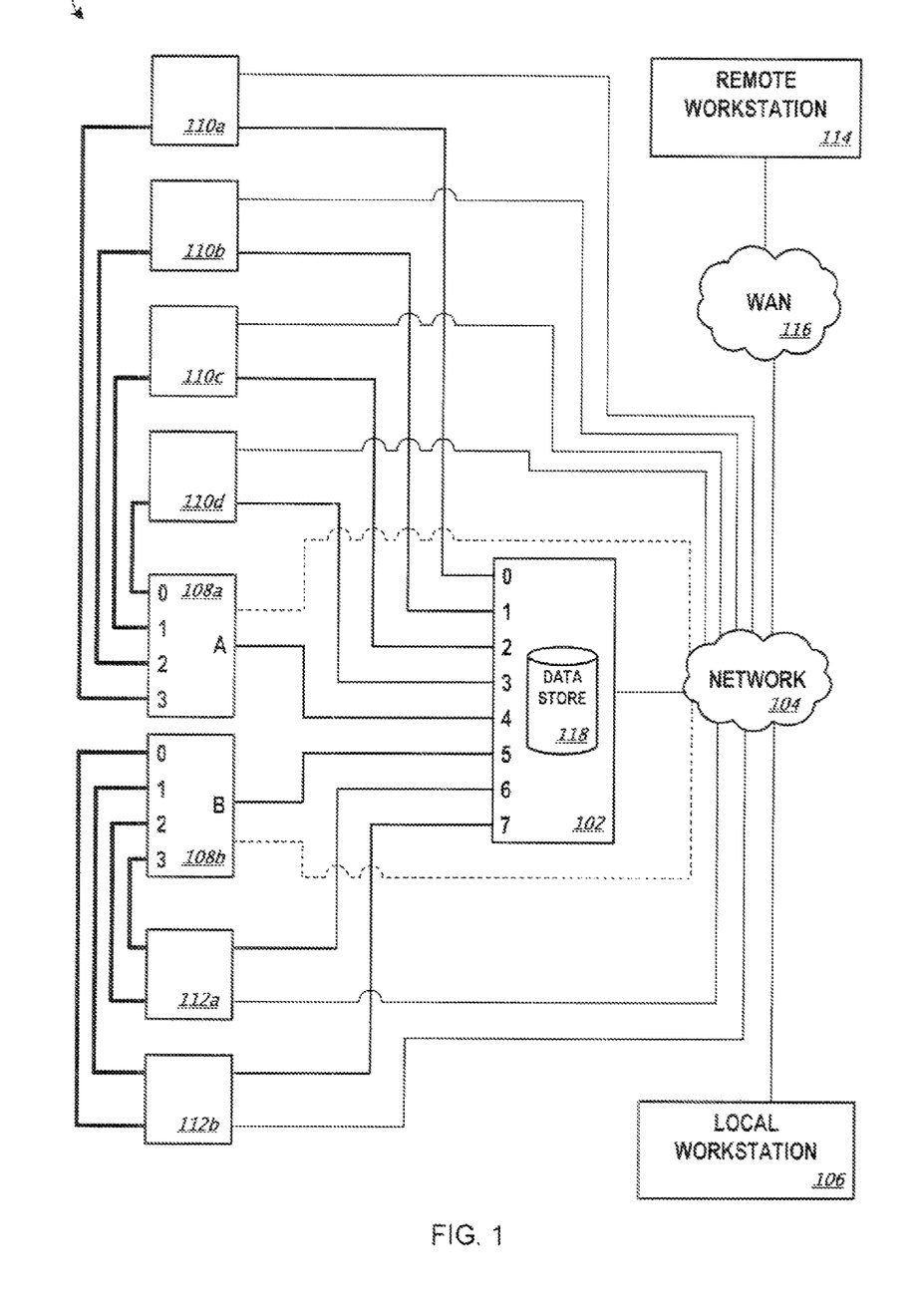
FIG. 1 is a block diagram of an example computer network including a decoupled terminal server.
Figure 9:
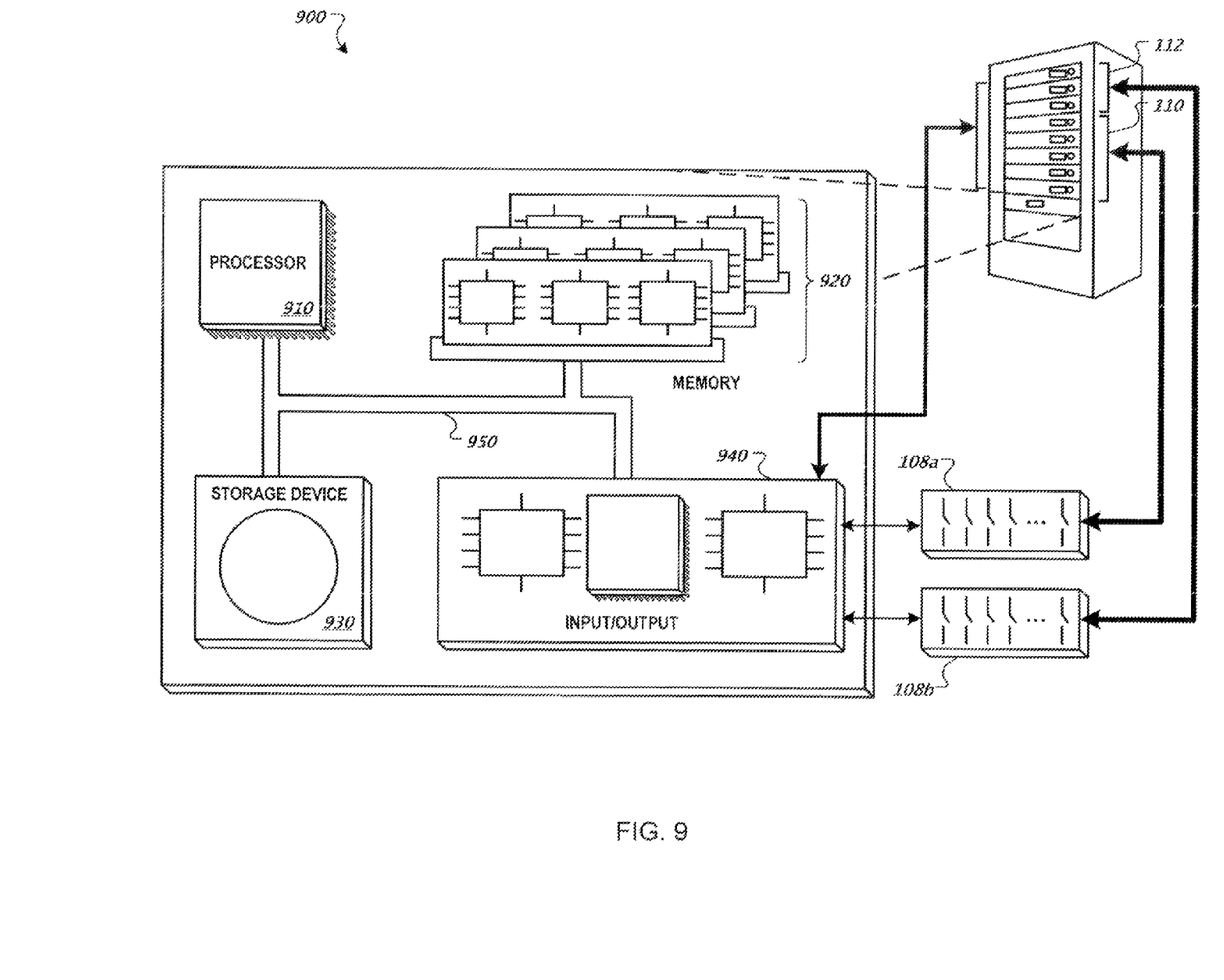
FIG. 9 is block diagram of an example terminal server.
Figure 10:
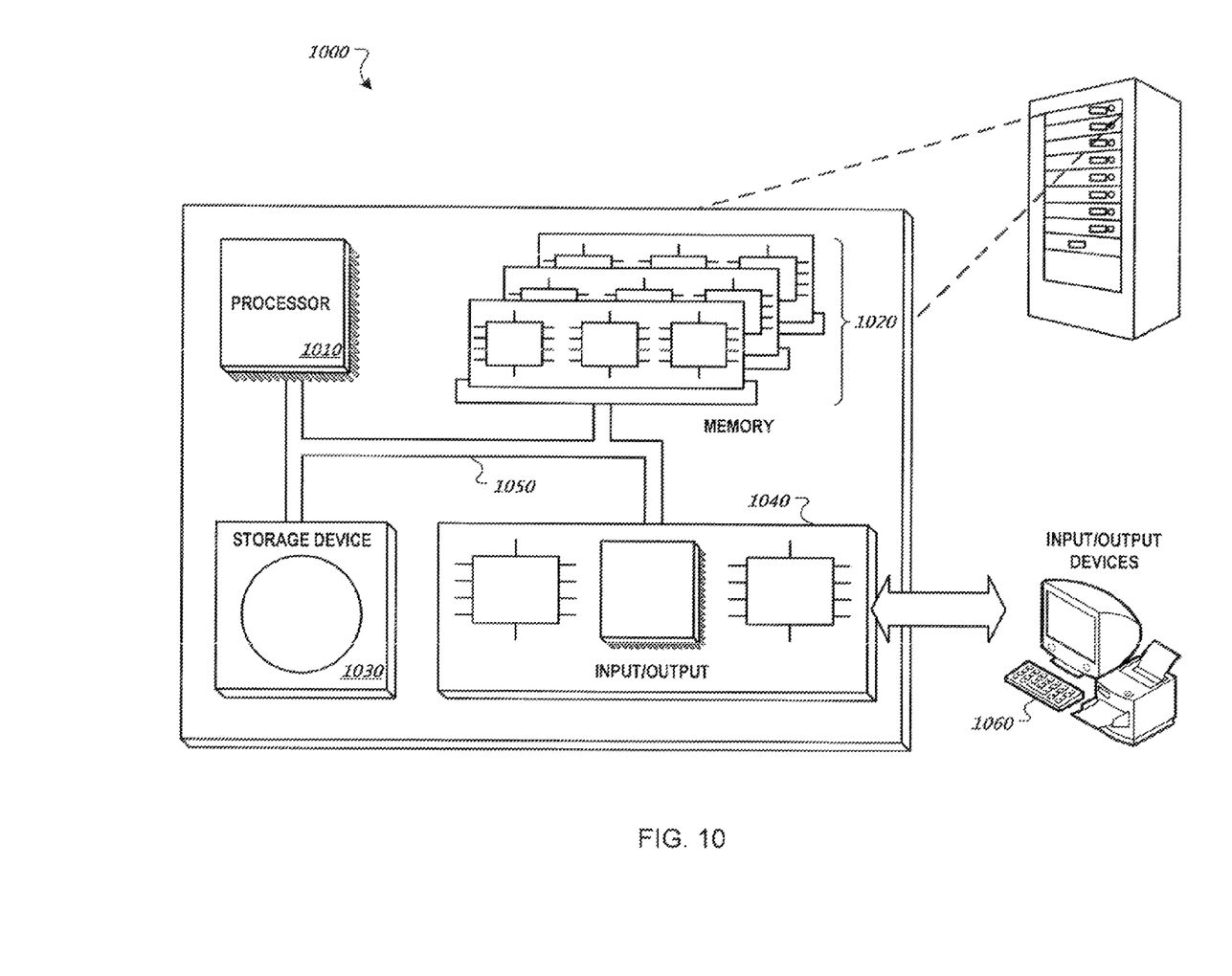
FIG. 10 is block diagram of an example computer system.

FIG. 1 is a block diagram of an example computer network system 100 including a decoupled terminal server device 102. The terminal server device 102, a local workstation 106, agent devices 108a and 108b, computer devices 110a, 110b, 110c, 110d, 112a and 112b, and a remote work station 114 can, for example, communicate over a local area network (LAN) 104 and/or a WAN, 116, such as the Internet. An example terminal server device 102 implementation is shown in FIG. 9, and example computer device implementations 110 and 112 and/or workstation implementations 106 and 114 are shown in FIG. 10.

The terminal server device 102 includes communication ports 0 though 7. In an implementation, the communication ports are serial communication ports. Other communication protocols, however, can also be used.

The agent devices 108a and 108b each include four agent ports, 0-3. In this example, the agent device 108a and the agent device 108b are power agent devices that manage power provided to computer devices 110a-d and to computer devices 112a-b, respectively. The agent ports 0-3 of the agent device 108a are thus power ports, e.g., power outlets that provide power to the computer devices 110d, 110c, 110b, and 110a, respectively. Likewise, the agent ports 0 and 1 of the agent device 108b are power ports that provide redundant power to the computer device 112b and the agent ports 2 and 3 of the agent device 108b are power ports that provide redundant power to the computer device 112a. Other agent devices can also be used.

The computer devices 110a, 110b, 110c, 110d, 112a and 112b can, for example, include server computers that are networked over the network 104. The networked computers 110a, 110b, 110c, 110d, 112a and 112b can, for example, facilitate data processing functions for an enterprise, e.g., a company network infrastructure, a distributed search engine, a web publisher, etc. Other computer device implementations and functions can also be used.

The terminal server device 102 can direct communications received from the local workstation 106 and/or the remote workstation 114 over the network 104 and/or 116 to the communication ports 0-7. The agent devices 108a and 108b include communication ports A and B that are in communication with the communication ports 4 and 5, respectively, of the terminal server device 102. The terminal server device 102 can thus receive commands for the agent devices 108a and 108b over the network 104 and transmit the commands to the agent devices 108a and 108b over the communication port 4 and 5, respectively.

Likewise, the terminal server 102 can, for example, facilitate out-of-band communications with the computer devices 110a, 110b, 110c, 110d, 112a and 112b over the communication ports 0, 1, 2, 3, 6, and 7, respectively. For example, in the event one of the computer devices 110a, 110b, 110c, 110d, 112a and 112b malfunctions and is not responding to in-band communications, out-of-band management and troubleshooting can be facilitated through a corresponding serial communication port on the terminal server 102.

In another implementation, the terminal server device 102 and the agent devices 108a and 108b can communicate over the network 104, as indicated by the dashed communication paths between the agent devices 108a and 108b and the network 104. In this implementation, commands can be provided to the agent devices 108a and 108b either in-band, i.e., through the network 104, or out-of-band, i.e., over the serial communication links between ports A and B of the agent devices 108a and 108b and ports 4 and 5, respectively, of the terminal server device 102. Other communication schemes can also be used, e.g., a wireless communication scheme.

The agent device 108a can, for example, be of a first agent type and the agent device 108b can be of a second agent type, such as types of agent devices provided by first and second manufacturers, or types of agent device models provided by a particular manufacturer, or types of agent devices implementing different firmware or software builds. Each agent device type may be associated with a corresponding set of commands, or a control instruction set, for directing an agent device of that type to perform a particular action. In an implementation, the commands for an agent device are accessed through a terminal server 102 control environment.

In one implementation, the terminal server 102 control environment can be accessed at a workstation, such as the local workstation 106 and/or the remote workstations 114. For example, the local workstation 106 and/or the remote workstation 114 can direct the agent device 108a, and/or the agent device 108b, to turn on the power to one or more of its power ports or to turn off the power to one or more of its power ports. For each command, terminal server device 102 can execute a control instruction set corresponding to the respective type of the agent device 108a and 108b to facilitate invocation of the function at the agent device.

In an implementation, the terminal server device 102 can include a data store 118. In another implementation, the terminal server device 102 can be in communication with the data store 118, for example, through the network 104. The data store 118 can, for example store instructions executable by the terminal server device 102. In an implementation, the data store 118 can include agent device control instruction sets and control environment instructions. The terminal server device 102 can execute the control environment instructions to instantiate the terminal server control environment to facilitate control of one or more of the agent devices 108a and 108b. For example, the control environment can be a command shell provided by an operating system of the terminal server device 102. Within the control environment, the terminal server device 102 can execute control environment commands in response to requests from the local workstation 106 or the remote workstation 114. The commands can, for example, cause the agent devices 108a and 108b to perform one or more functions.

In an implementation, the agent device control instruction sets are executed in response to the control environment commands. In one implementation, the agent device control instruction sets include control scripts, such as a shell script that may be executed by the command shell provided by the operating system of the terminal server device 102. For example, a control script for a particular agent device and agent device type, e.g., agent device 108a, may be the following:

```
case "$2" in
on)
  wget  http://power_agent_device_a/power_on?power_port="$1"
  ssh  logger@logserver  "echo  'Now  turning  on  power'>>logfile"
  ;;
off)
  wget  http://power_agent_device_a/power_off?power_port="$1"
  ssh  logger@logserver  "echo  'Now  turning  off  power'>>logfile"
  ;;
reboot)
  wget http://power_agent_device_a/power_reboot?power_port="$1"
  ssh  logger@logserver  "echo  'Now  rebooting  power'>>logfile"
  ;;
*)
  ssh  logger@logserver  "echo  'Commend  not  recognized'>>logfile"
  ;;
esac
```

In this control script, $1 and $2 are first and second parameters, respectively, that are passed to the script when the script is called. The $2 parameter can, for example, define the action requested by a computer device, e.g., the local workstation 106 or the remote workstation 114. In this example, the computer device may request that a particular power port be turned on, turned off, or rebooted. The $1 parameter includes the power port on which to perform the requested action.

For the example control instruction set shown above, an in-band wget control instruction can be communicated over the network 104 to the agent device 108a using the network address "agent_device_a." Depending on the value of the second parameter, the agent device 108a may be sent a "power_on," "power_off," or "power_reboot" command. The first parameter, the power port on which to perform the action, specifies on which agent power port the command should be executed.

In addition to the in-band agent port process command described above, the control script can, for example, also define a secondary process command associated with the agent process command. The secondary process command can, for example, write a message to a log file indicating the particular action that was requested and sent to the agent device 108a. In one implementation, the secondary process command can be communicated to a device other than the agent device to which the agent port process command is sent. In this example, the ssh command sends the log message to a network address of "logserver." Other secondary process commands can also be used, e.g., a secondary process command may be a notification command, such as a message sent to electronic mail recipient, or a handshake command that can verify a sever recovery.

Figure 2:
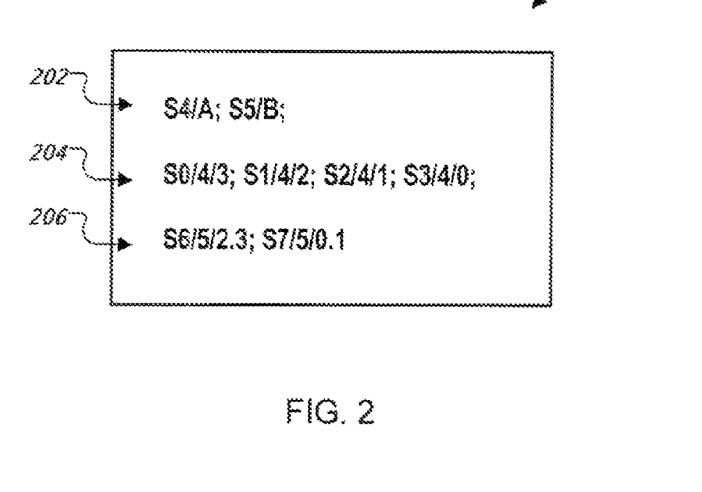
FIG. 2 shows example configuration mapping instructions.

An agent port process command and/or a secondary process command can also be sent to an agent device using an out-of-band communication ports, e.g., ports 4 and 5 of the terminal server device 102. The data store 118 can, for example, include configuration mapping instructions that map communication ports of the terminal server device 102 to communication ports of the agent devices 108a-b and the computer devices 110a-d, 112a-b. FIG. 2 shows example configuration mapping instructions 200. The example configuration mapping instructions 200 include terminal port mapping instructions 202, first agent mapping instructions 204, and second agent mapping instructions 206.

The terminal port mapping instructions 202 include instructions, S4/A and S5/B that map port 4 of the terminal server device 102 to port A of the agent device 108a and port 5 of the terminal server device 102 to port B of the agent device 108b. The first and second agent mapping instructions 204 and 206 include instructions that map a port of the terminal server device 102 to a corresponding computer device 110 and an agent device power port. For example, the instruction S0/4/3 maps port 0 of the terminal server device 102 to the computer device 110a, and maps power port 3 of the agent device 108a to the power supply of the computer device 110a. Thus, the instructions S0/4/3 indicate that the computer device 110a connected to communication port 0 of the terminal server device 102 has power controlled by the agent device 108a connected to communication port 4 of the terminal server device 102. Likewise, the instruction S1/4/2 maps port 1 of the terminal server device 102 to the computer device 110b, and maps power port 4 of the agent device 108a to the power supply of the computer device 110b. The instructions S2/4/1 and S3/4/0 define a similar mapping and control scheme.

The second agent mapping instructions 206 defines a mapping for computer devices powered by redundant power ports. For example, the instruction S6/5/2.3 maps port 6 of the terminal server device 102 to the computer device 112a, and maps power ports 2 and 3 of the agent device 108b to the power supplies of the computer device 112a. Accordingly, the instructions S6/5/2.3 indicate that the computer device 112a connected to communication port 6 of the terminal server device 102 has power controlled by the agent device 108b connected to communication port 5 of the terminal server device 102. The instructions S7/5/0.1 define a similar mapping and control scheme.

Figure 3:
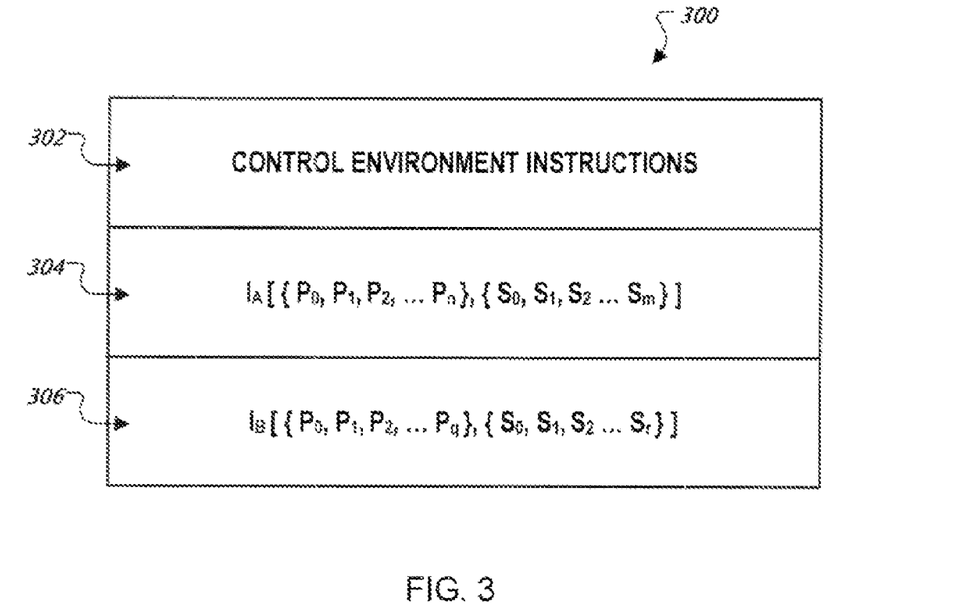
FIG. 3 shows example instructions that include control environment instructions and agent device control instruction sets.

FIG. 3 shows example instructions 300 that include control environment instructions 302 and agent device control instruction sets 304 and 306. In one implementation, the control environment instructions 302 can be script instructions. In another implementation, the control environment instructions 302 can be compiled instructions. Other implementations can also be used.

The instructions 300 include a set of control instructions 304, e.g., instructions for the agent device 108a of type A and a set of control instructions 306, e.g., instructions for the agent device 108b of type B. In one implementation, the control instructions 304 and 306 can be script instructions. In another implementation, the control instructions can be compiled instructions. Other implementations can also be used.

Execution of the control environment instructions 302 can generate a control environment for a terminal server device, such as the terminal server device 102. The sets of control instructions 302 and 304 include agent port process commands $P_0$-$P_n$ and $P_0$-$P_q$, respectively. The agent port process commands $P_0$-$P_n$ and $P_0$-$P^q$ cause one or more functions to be executed on an active port of an agent device. For example, if the agent device is a power agent, agent port process commands can include a power on command, a power off command, a cycle power command, etc.

In addition, the sets of control instructions 304 and 306 include secondary process commands $S_0$ -$S_m$ and $S_0$-$S_r$, respectively. The secondary process commands $S_0$-$S_m$ and $S_0$-$S_r$ can include commands that are independent of an agent port process command, e.g., a logging command, a notification command, a handshake command, a maintenance routine command, etc.

In an implementation, the control environment instructions 302 can utilize the mapping instructions 200 to determine a particular command to execute for an agent device. For example, with respect to FIG. 1, if power is to be cycled to computer device 110a, the mapping instructions 200 define that the corresponding command(s) for power port 3 of the agent device 108a can be transmitted to the agent device 108a over the terminal server device 102 port 4, e.g., S3/4/0.

In an implementation, one or more secondary process commands can be associated with a particular agent port process command. For example, a "power on" agent port process command for an agent device can be associated with a logging command and a maintenance routine command. Thus, when a computer device connected to a corresponding agent port is powered on, the time that the computer device is powered on can be logged, and the associated maintenance routine command may be executed as part of the power on process for the computer device, or may be executed after the computer device has powered on.

In an implementation, the agent port process commands and the secondary process commands can be transmitted either in-band or out-of-band. For example, the "power on" agent port process command for an agent device can be transmitted out-of-band, e.g., over a serial communication link connected to port 4 of the terminal server 102; a first secondary process command can be transmitted out-of-band, e.g., over a serial communication link connected to port 0 of the terminal server; and a second secondary process command can be transmitted in-band, e.g., over the network 104 to the computer device 110*a*.

In one implementation, the device control instructions 304 and 306 can specify in-band communications and out-of-band communications for each agent port process command and secondary process command. In another implementation, the device control instructions 304 and 306 can allow a user to select whether particular process commands are to be transmitted in-band or out-of-band from the control environment of the terminal server device 102.

In another implementation, mapping and control instructions can be integrated in an instruction set, such as a script. An example implementation is shown below:

S0.key_press ^P
S0.control_script /usr/bin/control_agent_a 3 reboot
S1.key_press ^P
S1.control_script /usr/bin/control_agent_a 2 reboot
S2.key_press ^P
S2.control_script /usr/bin/control_agent_a 1 reboot
S3.key_press ^P
S3.control_script /usr/bin/control_agent_a 0 reboot In this example implementation, the "S0.key_press ^P" instruction indicates that when the terminal server device 102 receives a control P key press when communication port 0 is monitored in a control environment, the terminal server 102 shall execute the control script associated with the communication port 0. With respect to FIG. 1, for example, the "S0.control_script /usr/bin/control_agent_a 3 reboot" instruction associates the control script "control_agent_a" with the communication port 0 of the terminal server device 102 and the power port 3 of the agent device 108*a*. The control script is "control_agent_a" and the control is passed the parameters "3" and "reboot." The "3" parameter indicates the power port of the agent device 108*a* on which to perform the power process command "reboot." Other implementations can also be used.

Figure 4:
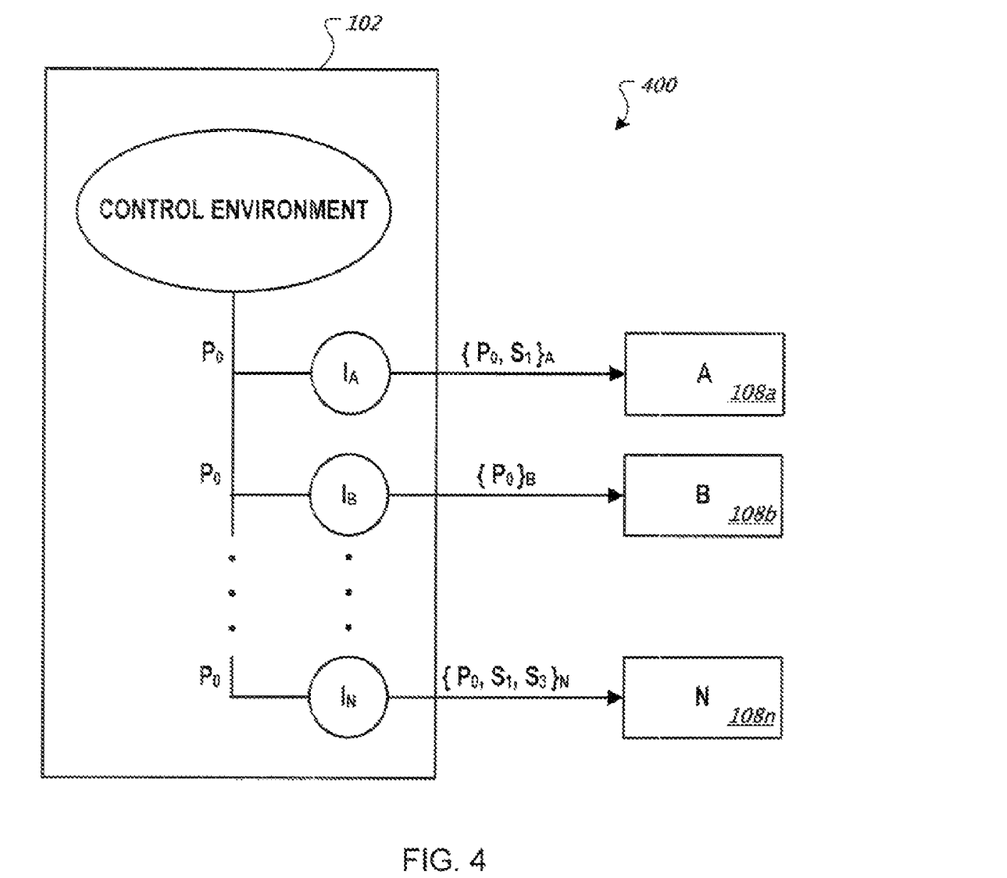
FIG. 4 is a block diagram illustrating an example of an agent device control protocol.

FIG. 4 is a block diagram illustrating an example of an agent device control protocol 400. The protocol 400 can, for example, be implemented in the terminal server device 102. The instruction sets $I_A, I_S \ldots I_N$ can define associations between port process commands P and secondary process commands S. For example, the agent port process command $P_0$ can be sent to multiple agent devices, e.g. agent devices 108*a*-108*n*. The control instruction set $I_A$ associated with the agent device 108*a* type, can associate with the port process command $P_0$ a secondary process command $S_1$, e.g., writing a message to a log file. The control instruction set $I_B$ associated with the agent device 108*b* type, does not associate any secondary process command with the port process command $P_0$. The control instruction set $I_n$ associated with the agent device 108*n* type, can associate with the port process command $P_0$ secondary process commands $S_1$, e.g., writing a message to a log file, and $S_3$, e.g., generating an e-mail notification of the execution of the port process command $P_0$.

Figure 5:
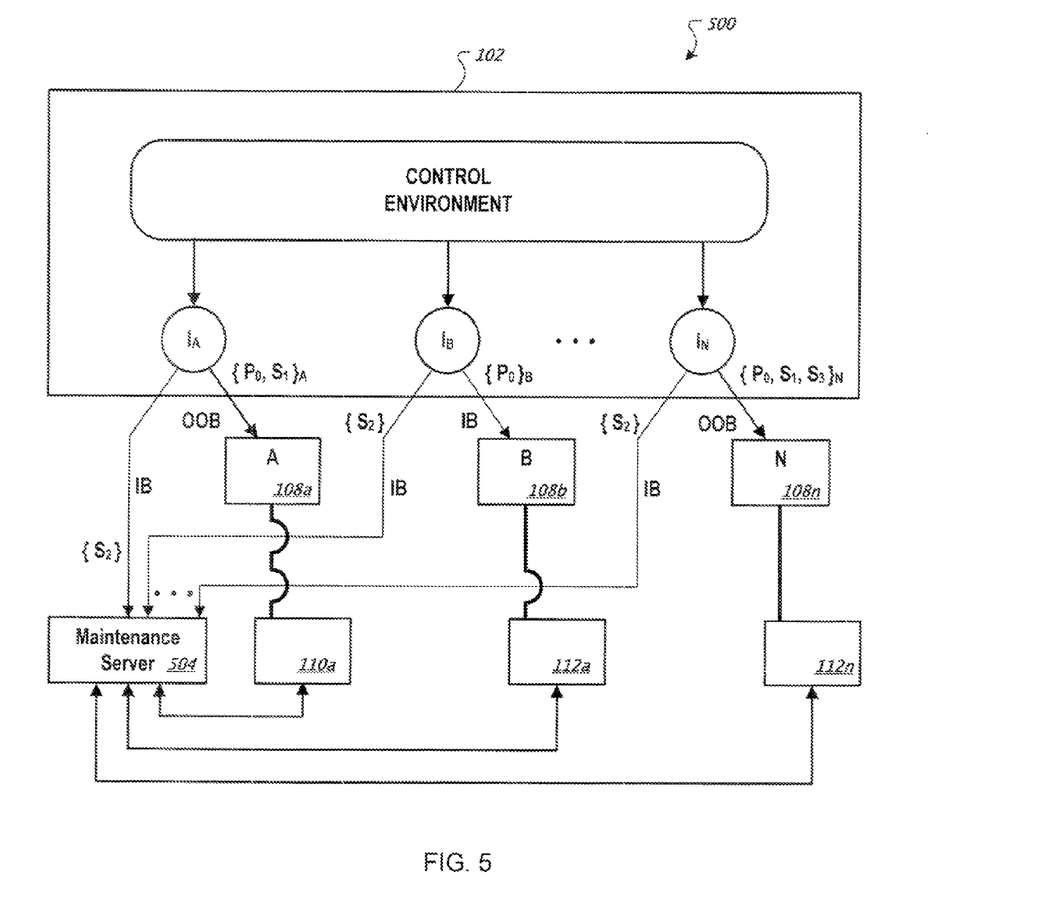
FIG. 5 is a block diagram illustrating another example agent device control protocol.

FIG. 5 is a block diagram illustrating another example agent device control protocol 500. The instruction sets $I_A, I_B \ldots I_N$ define associations between port process commands P and secondary process commands S, and also define whether the port process commands P and secondary process command S are communicated in-band or out-of-band. The protocol 500 can, for example, be implemented with the terminal server device 102. Corresponding agent devices 108*a*, 108*b* . . . 108*n* have power ports connected to corresponding computer devices 110*a*, 112*a* . . . 112*n*. A maintenance server computer 504 is connected to the computer devices 110*a*, 112*a* . . . 112*n* and the terminal server 102 through a network, such as a LAN and/or WAN.

The example instruction sets $I_A, I_B \ldots I_N$ associate a secondary process command $S_2$ with the port process command $P_0$. In an implementation, the secondary process command $S_2$ is transmitted to the maintenance server 504 in-band. For example, the secondary process commands $S_2$ can direct the maintenance server 504 to monitor the status of a computer device affected by the corresponding agent port process command $P_0$ and verify that the computer device transitions to an expected state in response to the execution of the execution of the port process command $P_0$.

The instruction sets $I_A, I_B \ldots I_N$ can further define associations between the port process command $P_0$ and the secondary process commands S. For example, he control instruction set $I_A$ associated with the agent device 108*a* type, can associate with the port process command $P_0$ a secondary process command $S_1$, e.g., writing a message to a log file, and can further define that the commands be transmitted to the computer device 108*a* out-of-band. The control instruction set $I_B$ associated with the agent device 108*b* type, does not associate any secondary process command with the port process command $P_0$, and defines that the port process command be transmitted to the agent device 108*b* in-band. The control instruction set $I_n$ associated with the agent device 108*n* type, can associate with the port process command $P_0$ secondary process commands $S_1$, e.g., writing a message to a log file, and $S_3$, e.g., generating an e-mail notification of the execution of the port process command $P_0$, and can further define that the commands be transmitted to the computer device 108*a* out-of-band.

Figure 6:
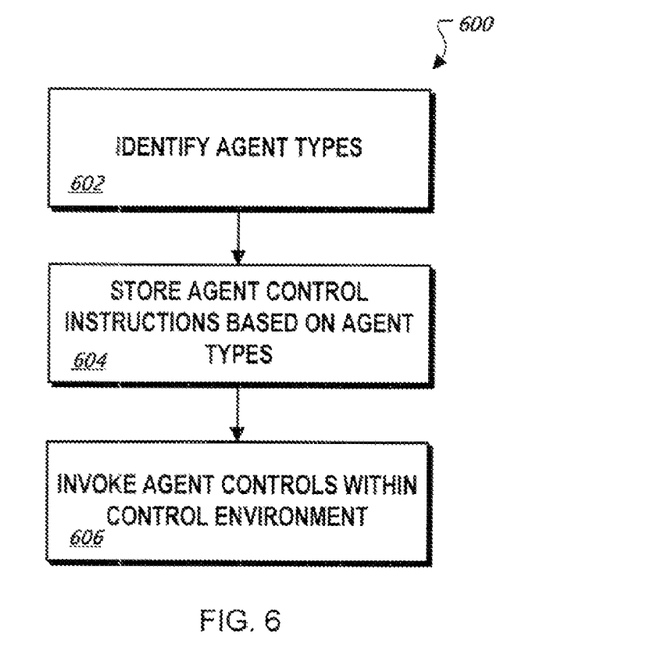
FIG. 6 is a flow diagram of an example process for identifying and storing agent device control instructions.

FIG. 6 is a flow diagram of an example process 600 for identifying and storing agent control instructions. The process 600 can, for example, be implemented in a system such as the system 100 of FIG. 1 implementing the control mapping instructions 200 of FIG. 2 and/or the instructions 300 of FIG. 3. Alternatively, the process 600 can be implemented in a system executing the agent device control protocol 400 of FIG. 4 and/or 500 of FIG. 5.

Stage 602 identifies agent types. For example, the types of the agent devices 108*a* and 108*b* in communication with the terminal server device 102 may be identified by the terminal sever 102, or by a user, or by some other identification process.

Stage 604 stores agent control instruction sets based on the agent types. For example, the agent control instruction sets $I_A$, $I_B$, and $I_N$ may be stored in the data store 118. Each of the agent control instruction sets $I_A$, $I_B$, and $I_N$ can, for example, be based on an agent type, e.g., and agent device of agent type A, an agent device of agent type B, and an agent device of agent type N. Accordingly, each of agent control instruction sets $I_A$, $I_B$, and $I_N$ can, for example, facilitate a different command or communication protocol according to a correspond agent device type.

Stage 606 invokes agent controls within a control environment. For example, the terminal server device 102 can execute control environment instructions that instantiate a control environment. In response to a request from the local workstation 106 to turn off power to the computer device 110*a*, the terminal server device 102 executes an agent control within the control environment that is associated with turning off power to the computer device 110*a*.

Figure 7:
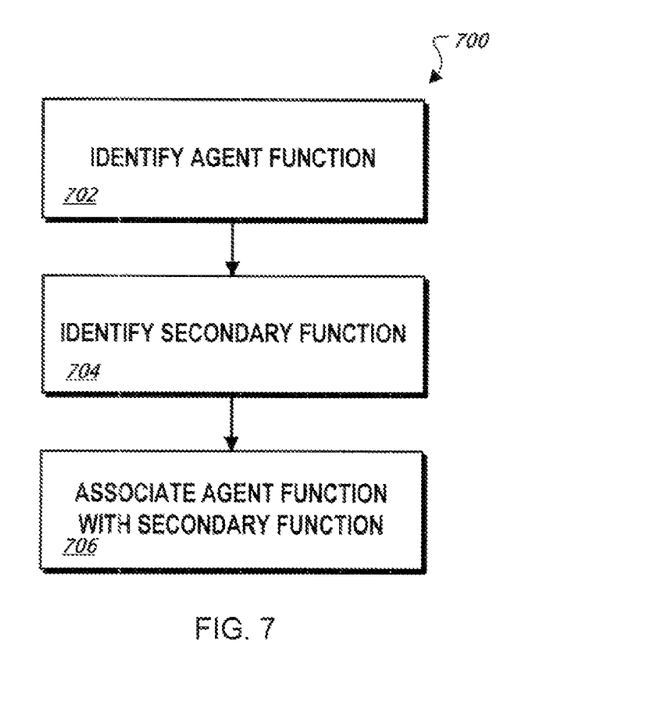
FIG. 7 is a flow diagram of an example process for associating one or more agent functions and one or more secondary functions.

FIG. 7 is a flow diagram of an example process 700 for associating one or more agent functions and one or more secondary functions. The process 700 can, for example, be implemented in a system such as the system 100 of FIG. 1 implementing the control mapping instructions 200 of FIG. 2 and/or the instructions 300 of FIG. 3. Alternatively, the process 700 can be implemented in a system executing the agent device control protocol 400 of FIG. 4 and/or 500 of FIG. 5.

Stage 702 identifies an agent function. For example, in response to receiving an input, the terminal server 102 may identify an agent function, such as the agent port process command $P_0$.

Stage 704 identifies a secondary function. For example, in response to receiving an input, the terminal server 102 may identify a secondary function, such as the secondary process command $S_1$.

Stage 706 associates the agent function with the secondary function. For example, the agent port process command $P_0$ and the secondary process command $S_1$ may be associated in a control script, such as the control_agent_a control script described above, which associates a wget agent port process command with a ssh secondary process command for each of the on, off, and reboot commands.

Figure 8:
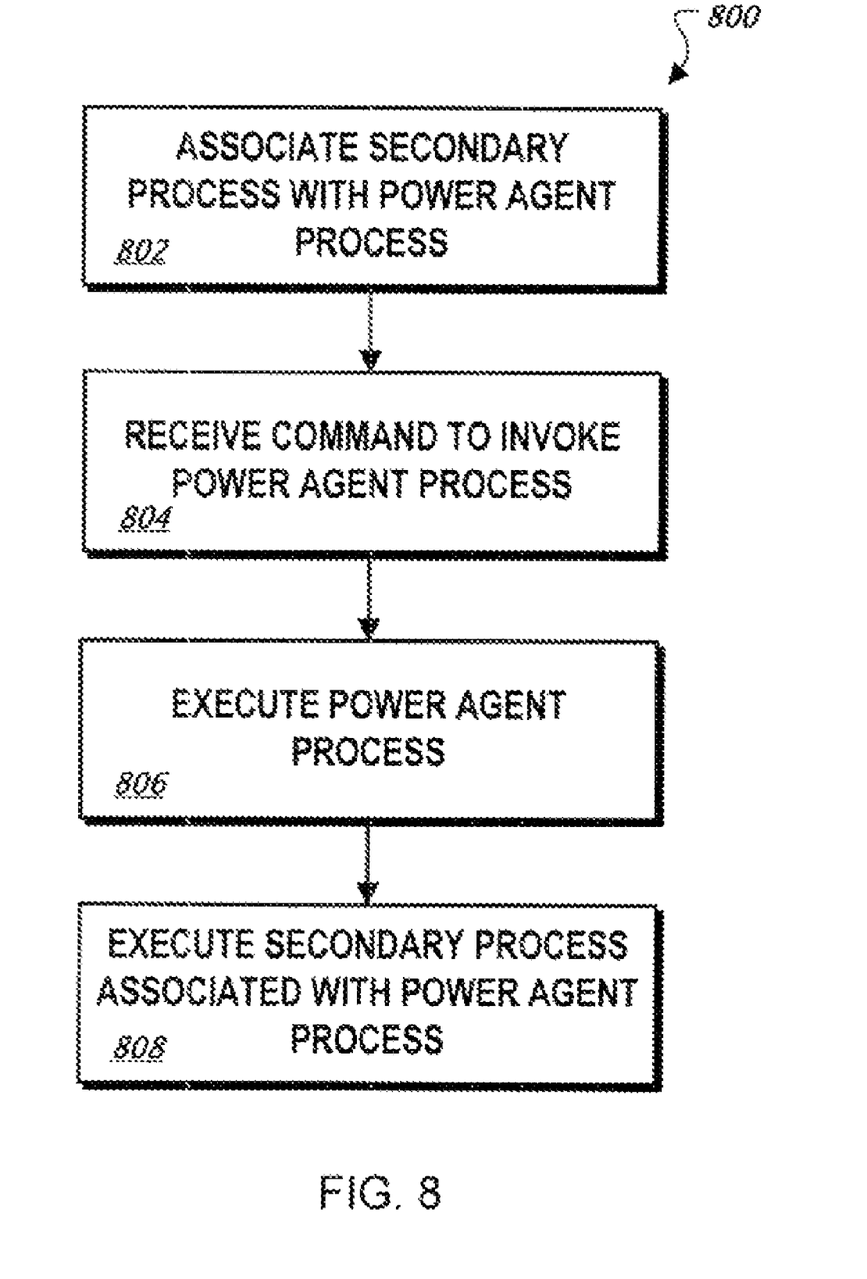
FIG. 8 is a flow diagram of an example process for executing one or more agent processes and one or more associated secondary process.

FIG. 8 is a flow diagram of an example process 800 for executing one or more agent processes and one or more associated secondary process. The process 800 can, for example, be implemented in a system such as the system 100 of FIG. 1 implementing the control mapping instructions 200 of FIG. 2 and/or the instructions 300 of FIG. 3. Alternatively, the process 800 can be implemented in a system executing the agent device control protocol 400 of FIG. 4 and/or 500 of FIG. 5.

Stage 802 associates a secondary process with a power agent process. For example, the control_agent_a control script described above associates a wget agent port process command with a ssh secondary process command for each of the on, off, and reboot commands. In another implementation, the agent device control instructions 304 and 306 associate port process commands with secondary process commands.

Stage 804 receives a command to invoke the power agent process. For example, the terminal server device 102 can receive a request from a computer device, such as the local workstation 106, to execute the agent port process command $P_0$.

Stage 806 executes the power agent process. For example, the terminal server device 102 can transmit the $P_0$ agent port process command to the agent device 108a, and the agent device 108a can execute the process defined by the agent port process command $P_0$.

Stage 808 executes the secondary process associated with the power agent process. For example, the terminal server device 102, a maintenance server, or some other device can execute the secondary process command $S_1$ associated with the $P_0$ agent port process command, depending on the type of the secondary process command $S_1$.

FIG. 9 is block diagram of an example terminal server 900. The server 900 includes a processor 910, a memory 920, a storage device 930, and an input/output device 940. Each of the components 910, 920, 930, and 940 can, for example, be interconnected using a system bus 950. The processor 910 is capable of processing instructions for execution within the terminal server 900. The processor 910 is capable of processing instructions stored in the memory 920 or on the storage device 930.

The memory 920 stores information within the terminal server 900. In one implementation, the memory 920 is a computer-readable medium. In one implementation, the memory 920 is a volatile memory unit. In another implementation, the memory 920 is a nonvolatile memory unit.

The storage device 930 is capable of providing mass storage for the terminal server 900. In one implementation, the storage device 930 is a computer-readable medium. In various different implementations, the storage device 930 can, for example, include a hard disk device, an optical disk device, or some other large capacity storage device.

The input/output device 940 provides input/output operations for the terminal server 900. In one implementation, the input/output device 940 can include one or more of a network interface device, e.g., an Ethernet card, a serial communication device, e.g., and RS-232 port, and/or a wireless interface device, e.g., and 802.11 card.

In one implementation, the terminal server 900 can communicate with agent devices over a serial communication link, e.g., power agent devices 108a and 108b, and can communication with computer devices 110 and 112 over one or more of a serial communication link and a network communication link. The power agent devices 108a and 108b, can, for example, be configured to provide power to the computer devices 110 and 112, respectively. The terminal server 900 can, for example, interact with the power agent devices 108a and 108b and the computer devices 110 and 112 substantially as described with respect to FIGS. 1-8 above.

FIG. 10 is block diagram of an example computer system 1000. The example computer system 1000 can be utilized to implement a server computer device and/or a client computer device, or some other computer device. In one implementation, the example computer system 1000 can be utilized to implement one or more of the computer devices 110 and 112 and/or workstations 106 and 114 of FIG. 1. For example, the computer system 1000 can be utilized to implement the workstations 106 and 114 to facilitate user access to the terminal server 102 control environment.

The system 1000 includes a processor 1010, a memory 1020, a storage device 1030, and an input/output device 1040. Each of the components 1010, 1020, 1030, and 1040 can, for example, be interconnected using a system bus 1050. The processor 1010 is capable of processing instructions for execution within the system 1000. In one implementation, the processor 1010 is a single-threaded processor. In another implementation, the processor 1010 is a multi-threaded processor. The processor 1010 is capable of processing instructions stored in the memory 1020 or on the storage device 1030.

The memory 1020 stores information within the system 1000. In one implementation, the memory 1020 is a computer-readable medium. In one implementation, the memory 1020 is a volatile memory unit. In another implementation, the memory 1020 is a non-volatile memory unit.

The storage device 1030 is capable of providing mass storage for the system 1000. In one implementation, the storage device 1030 is a computer-readable medium. In various different implementations, the storage device 1030 can, for example, include a hard disk device, an optical disk device, or some other large capacity storage device.

The input/output device 1040 provides input/output operations for the system 1000. In one implementation, the input/output device 1040 can include one or more of a network interface device, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 1060.

The apparatus, methods, flow diagrams, and structure block diagrams described in this patent document may be implemented in computer processing systems including program code comprising program instructions that are executable by the computer processing system. Other implementations may also be used. Additionally, the flow diagrams and structure block diagrams described in this patent document, which describe particular methods and/or corresponding acts in support of steps and corresponding functions in support of disclosed structural means, may also be utilized to implement corresponding software structures and algorithms, and equivalents thereof.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A system, comprising:
    a terminal server device including a plurality of communication ports;
    one or more agent devices, each agent device including a plurality of agent ports and a communication port, the communication port of each agent device connected to a corresponding communication port of the terminal server; and
    a data store in communication with the terminal server, the data store storing instructions executable by the terminal server, the instructions comprising:
    control environment instructions that upon execution by the terminal server instantiate a control environment to facilitate control of one or more power agent devices, wherein each of the one or more power agent devices is configured to provide power to one or more connected devices; and
    power agent device control instruction sets configured to be executed in response to corresponding control environment commands, each power agent device control instruction set based on a corresponding power agent device type and configured to facilitate control of one or more corresponding power agent devices, wherein each power agent device control instruction set comprises:
    one or more power port process commands operable to control the one or more power agent devices; and
    one or more secondary process commands operable to control one or more secondary agent devices in communication with the terminal server over corresponding communication ports, wherein each of the one or more secondary agent devices is not a power agent device.

2. The system of claim 1, wherein:
    the one or more agent devices comprise power agent devices.

3. The system of claim 2, wherein:
    the agent ports comprise power ports.

4. The system of claim 1, wherein:
    the communication ports comprise serial communication ports.

5. The system of claim 1, wherein:
    each agent device control instruction set comprises a control script.

6. The system of claim 1, wherein:
    the one or more secondary process commands comprise a logging command.

7. The system of claim 1, wherein:
    the one or more secondary process commands comprise a notification command.

8. The system of claim 1, wherein:
    an agent device control instruction set comprises:
    one or more in-band control instructions.

9. The system of claim 1, wherein:
    an agent device control instruction set comprises:
    one or more out-of-band control instructions.

10. The system of claim 1, comprising:
    configuration mapping instructions stored on the data store and configured to map communication ports of the terminal server to agent ports.

11. A system, comprising:
    a terminal server device including a plurality of communication ports;
    a data store in communication with the terminal server, the data store storing instructions executable by the terminal server, the instructions comprising:
    control environment instructions that upon execution by the terminal server instantiate a control environment to facilitate control of one or more power agent devices in communication with the terminal server over corresponding communication ports, wherein each of the one or more power agent devices is configured to provide power to one or more connected devices; and
    power agent device control instruction sets configured to be executed in response to corresponding control environment commands, each power agent device control instruction set based on a corresponding power agent device type and configured to facilitate control of one or more corresponding power agent devices, wherein each power agent device control instruction set comprises:
    one or more power port process commands operable to control the one or more power agent devices; and
    one or more secondary process commands operable to control one or more secondary agent devices in communication with the terminal server over corresponding communication ports, wherein each of the one or more secondary agent devices is not a power agent device.

12. The system of claim 11, comprising:
    one or more power agent devices, each power agent device including a plurality of power ports and a communication port, the communication port of each power agent device connected to a corresponding communication port of the terminal server.

13. The system of claim 12, comprising:
    configuration mapping instructions stored on the data store and configured to map communication ports of the terminal server to the power ports.

14. The system of claim 11, wherein:
    the communication ports comprise serial communication ports.

15. The system of claim 11, wherein:
    each power agent device control instruction set comprises a control script.

16. The system of claim 11, wherein:
    the one or more secondary process commands comprise a logging command.

17. The system of claim 11, wherein:
    a power agent device control instruction set comprises:
    one or more in-band control instructions.

* * * * *